T. F. WILSON.
CRANK CASE SUPPORT FOR AUTOMOBILES.
APPLICATION FILED OCT. 1, 1918.
1,290,458.
Patented Jan. 7, 1919.
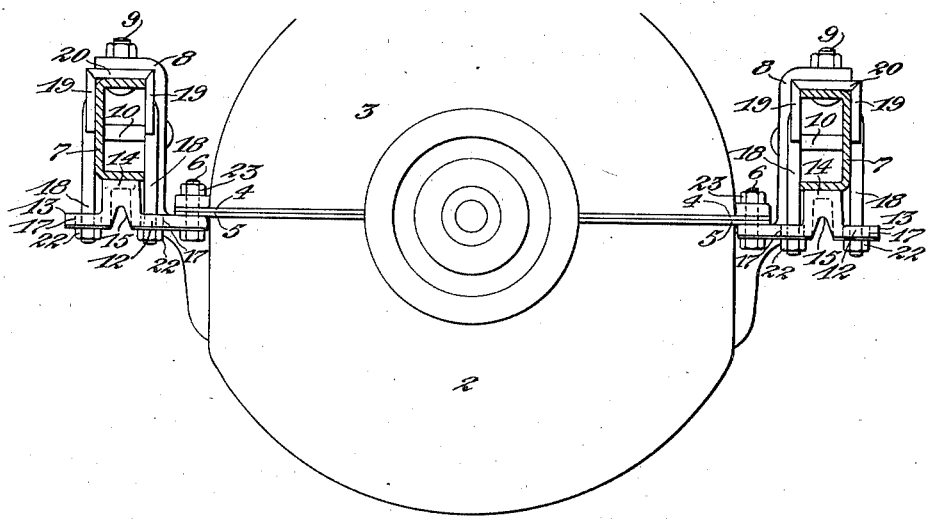
Fig. 1.
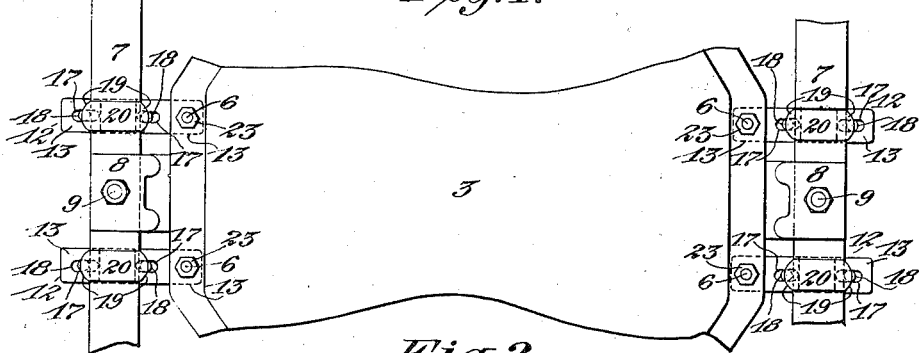
Fig. 2.
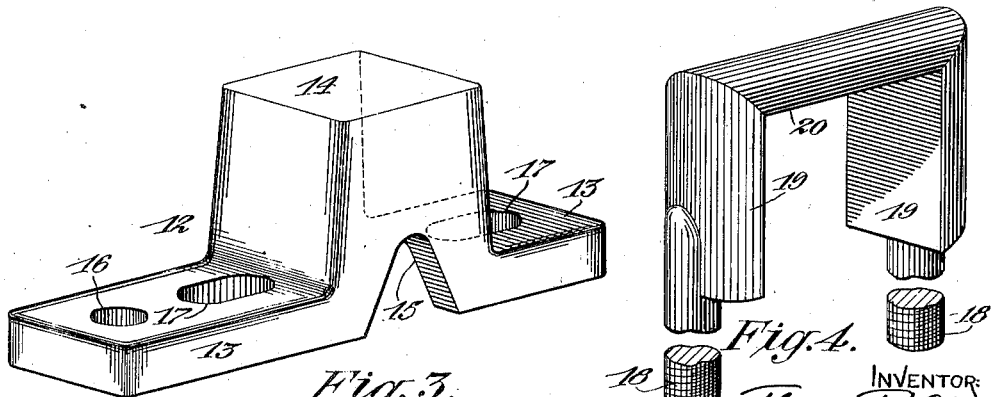
Fig. 3.
Fig. 4.
INVENTOR:
Thomas F. Wilson
BY
Arthur A. Armington
ATTORNEY

UNITED STATES PATENT OFFICE.

THOMAS F. WILSON, OF CRANSTON, RHODE ISLAND, ASSIGNOR TO APCO MANUFACTURING COMPANY, OF PROVIDENCE, RHODE ISLAND, A CORPORATION OF RHODE ISLAND.

CRANK-CASE SUPPORT FOR AUTOMOBILES.

1,290,458.     Specification of Letters Patent.     Patented Jan. 7, 1919.

Application filed October 1, 1918. Serial No. 256,377.

*To all whom it may concern:*

Be it known that I, THOMAS F. WILSON, a citizen of the United States, residing at Cranston, in the county of Providence, State of Rhode Island, have invented certain new and useful Improvements in Crank-Case Supports for Automobiles, of which the following is a specification.

My invention relates to repair fitments for automobiles and consists of an improved reinforcing- and supporting-device for the crank-case or power-plant housing of the engine. The object of my improvement is to provide a reinforcement or repair fitting for supporting the lower section of the power-plant housing or crank-case from the frame or chassis of the automobile, and one which may be applied to use with the original supporting-means in place to strengthen and stiffen its structure; or which may be substituted in place thereof should the original supports become broken. A particular object of the invention is to provide a device for this purpose which may be attached in place without dismantling the engine and without requiring special fitting or alteration in the structure of the car.

The manner and means for carrying out the improvement are fully described in the following specification, illustrated by the accompanying drawings, in which like reference characters designate like parts. In the drawings:—

Figure 1 is an end elevation of the lower portion of the power-plant of an automobile of well-known construction, illustrating the manner of applying my improved device thereto to support the crank-case from the sills or side-frames of the chassis;

Fig. 2, a plan view of the same.

Fig. 3, a perspective view of one of the supporting-cleats or braces; and

Fig. 4, a view in perspective of one of the clamp-bolts or clips for fastening the supporting-cleat to the channel-iron side-sill of the chassis.

Referring first to Fig. 1 of the drawings, I have here illustrated the power-plant of an automobile of usual type as inclosed within upper and lower housings, the lower one of which constitutes the crank-case of the engine, and in some instances also serving as a support and inclosure for the transmission elements of the driving-mechanism of the car. The crank-case 2 constitutes the base of the engine or motor, and is surmounted by the upper housing 3, the two parts being formed with flanges 4 and 5 at the joinder of their edges which are fastened together by the bolts 6. As usually constructed the cylinders of the engine are made integral with the upper housing 3 and are provided with a removable head, but these parts not being related to my present improvement, they are not herein shown or described. In accordance with the preferred practice the crank-case 2 is supported from the chassis of the automobile by a three-point suspension, so-called; one point of support being located centrally of the forward end of the engine and the other two at the rear, on opposite sides of the crank-case. In Figs. 1 and 2, 7, 7 designate the channel-iron side-sills or longitudinal frame-members of the chassis, and my improved fittings are attached thereto to support the crank-case 2 therefrom. In the type of construction herein illustrated the original design of the power-plant embodies the employment of two angle-shaped arms or lugs 8, 8 which are attached to or formed as a part of the crank-case body and reach up across the top of the channel-irons or side-sills 7, 7, being bolted thereto at 9 and 10 as shown in Fig. 1. In some instances, particularly in low-priced cars, these arms 8, 8 are contructed of sheet-metal, welded or riveted to the sides of the crank-case 2 and made hollow in cross-section to strengthen and stiffen their structure. It has been a common experience that these sheet-metal parts are not strong enough to stand the stress and strain induced by the vibrations of the engine, the racking of the car over rough roads, and the twisting of its frame due to careless or hard driving. That is to say, it has been found that these parts frequently give way under the strain imposed upon them and sometimes the break is gradual and may not be discovered until the crank-case is loosened on its supports and the parts of the transmission thrown out of alinement. This necessarily results in abnormal strain on the driving parts and the bearings may be ruined through this cause. To prevent this condition, or in other cases to provide for a quick and easy repair after the supporting-lugs are broken, I have provided an auxiliary crank-case support which may be applied to use either initially as a reinforcement for the original supports, or as a repair part to be used when occasion requires. In other words, my improved device may be applied as a reinforcement for the standard lugs already in position or may be used as the sole support for the crank-case where the original supports are broken.

Referring now to Fig. 3, the main brace or supporting-element for the side of the crank-case 2 consists of an arm or cleat 12 comprising a flat base-plate 13 surmounted by an upstanding, square block or lug 14. The lug 14 is preferably formed hollow to save metal and its sides are cut away at 15 with V-shaped openings to further lighten the weight of the whole element. The base-plate 13 projects beyond the front of the lug 14 to a greater distance at the forward end of the cleat 12 than at the rear and is provided with a hole or aperture 16 adapted to receive one of the bolts 6 in the flange of the crank-case 2, see Fig. 1. Adjacent the base of the lug 14, the plate 13 is apertured with slots 17 through which are inserted the clamp-bolts 18 for fastening it to the frame-sills or channel-irons 7. Referring to Fig. 4, the clamp-bolts 18 are of inverted U-shape, formed with two parallel legs 19, 19 joined at the top by a bridge-piece 20. The clamp-bolts 18 are adapted to fit over the channel-iron side-sill 7 with the bridge-piece 20 resting on the top thereof, and the legs 19, 19 straddling its sides. Preferably, the upper U-shaped portion of the clamp 18 is flattened on the inner side to provide a more extended bearing surface against the channel-iron 7, and the legs 19, 19 are extended downwardly in cylindrical bolts which are adapted to project through the slots 17 in the base of the cleat 12. The ends of the bolts 19 are threaded to receive nuts 22, which draw the cleat 12 into place as illustrated in Fig. 1. The manner of applying the complete device to use is as follows:

Referring to Fig. 2 of the drawings, I have here shown a pair of braces or supports applied to each side of the lower housing or crank-case 2 although in some instances a single brace on each side might be sufficient. That is to say, if the original supporting-arms or lugs 8, 8 are intact, my improved device may be applied as a reinforcement therefor, in which case a single brace or cleat 12 on each side of the crank-case might give sufficient support thereto. In most cases, however, particularly where one or the other of the original supporting-arms 8 has become fractured or broken, it is advisable to employ two of the auxiliary supports on each side of the crank-case and my improved structure provides for fastening them in place without detaching the original supports. That is to say, when one of the arms 8 becomes cracked or broken it is unnecessary to remove it as the cleats 12 are adapted for attachment on either side of it. The method of attaching the cleats 12 is extremely simple and requires no tools except an ordinary wrench. The two bolts 6 which hold the flanges 4, 5 of the housings 2 and 3 together, on opposite sides of each arm 8, are first removed, and the cleats 12 placed underneath the flange 5 with the holes 16 at their forward ends in line with the bolt-holes in the flanges. Slightly longer bolts 6 than those originally used are then inserted from below through the holes in the cleats 12 and flanges 4 and 5, and the nuts 23 are screwed on to their ends. The bolts 6 will thus be caused to draw the cleats 12 snugly into place beneath the lower flange 5 on the crank-case 2 while the flange 4 on the upper housing 3 will also be drawn down into a close joint thereagainst. With the two cleats 12 attached to the side of the crank-case 2 in this manner the clamp-bolts 18 are next set in place on the side-sills 7 to tie the cleats thereto. As before explained, the legs 19 of the clamp-bolts 18 straddle the sides of the channel-irons 7 and reach downwardly therebeyond to adapt their ends to be inserted through the slots 17 in the cleats 12. After the clamp-bolts 18 have been set in place in this manner the nuts 22 are applied to the threaded ends of their legs 19 and screwed snugly against the under side of the cleats 12. The cleats will thus be drawn upwardly to seat the top of their lugs 14 firmly against the under side of the channel-iron 7. In this way a particularly rigid and unyielding connection is made between the parts, and the crank-case receives a strong and staunch support while being braced laterally from the side-sills of the chassis. The slots 17 in the cleats 12 provide sufficient clearance for the bolt-legs 19 to allow for any variation in the relation between the parts to be joined and through this provision the fittings are rendered universally adaptable for different cars. That is to say, no two cars are exactly alike in the assembled relation of their parts, and the universal adaptability of my improved device provides for any irregularities in this respect. It is also to be noted that the whole load to be supported is borne by the clamp-bolts 18 resting on the top of the angle-irons 7 and through this method of clamping the parts in place an extremely rigid bridge-structure is provided which is proof against disarrangement under the stress of road shocks or the strain from frame distortion.

I am aware that it has heretofore been proposed to provide a repair part or fitment for bracing and supporting the power-plant housing of an automobile from the side-sills of the chassis. With previous arrangements, however, the application of the device to use has been attended with more or less difficulty, due to the awkward manner of its attachment, and in some cases requiring considerable fitting and adjustment. It will be seen that with the present improved device practically no fitting is required, the parts being universally adjustable to meet all requirements as regards variations in the relation of the parts to be connected, while at the same time it provides a stauncher and more direct connection between the crankcase and the chassis, and is held more securely due to its peculiar method of organization therewith.

Various modifications might be made in the structure and arrangement of the parts of the device without departing from the spirit or scope of the invention; therefore, without limiting myself to the exact embodiment herein shown and described, what I claim is:—

1. In a motor-vehicle construction, the combination with the chassis-frame having longitudinal side-sills, of a flanged power-plant housing arranged adjacent thereto, a cleat bolted to the under side of the flange on the housing, and a U-shaped clamp-bolt suspended across the side-sill with its ends secured to the cleat to support the latter therefrom.

2. In a motor-vehicle construction, the combination with the chassis-frame having longitudinal side-sills, of a flanged power-plant housing arranged between said side-sills, a cleat bolted to the flange of the casing, a U-shaped clamp-bolt arranged with its legs straddling the sides of the frame-sill and projecting through apertures in the cleat, and nuts on the ends of the bolt-legs for clamping the cleat against the under side of the frame-sill.

3. In a motor-vehicle construction, the combination with the longitudinal side-sills of the chassis-frame, of a flanged power-plant housing arranged between said frame-sills, a relatively flat cleat fastened to the side of the housing and formed with a lug adapted to bear against the under side of the frame-sill, a clamp-bolt supported from the top of the frame-sill and projecting downwardly through the cleat, and means on the bolt for tightening the cleat against the frame-sill.

4. A power-plant-housing support comprising a relatively flat cleat formed with an aperture for bolting it to the flange of the housing and also provided with spaced slots, and a U-shaped clamp-bolt adapted to be fitted across the frame-sill of the automobile with its legs straddling the sides thereof and secured at their ends in the slots in the cleat.

5. A power-plant-housing support comprising a relatively flat cleat having an aperture at its end to adapt it to be bolted to the flange of the housing and also provided with an upstanding lug, a U-shaped clamp-bolt adapted to be fitted across the frame-sill of the automobile with the ends of its legs inserted through the cleat, and nuts on the ends of the bolt-legs for drawing the cleat into place with its lug clamped against the under side of the frame-sill.

In testimony whereof I affix my signature.

THOMAS F. WILSON.